United States Patent [19]

Kageyama et al.

[11] Patent Number: 4,911,118

[45] Date of Patent: Mar. 27, 1990

[54] CYLINDER BLOCK REINFORCEMENT CONSTRUCTION FOR ENGINE

[75] Inventors: Takeshi Kageyama, Aki; Arata Matsue, Hiroshima, both of Japan

[73] Assignee: Mazda Motor Corporation, Hiroshima, Japan

[21] Appl. No.: 333,584

[22] Filed: Apr. 5, 1989

[30] Foreign Application Priority Data

Apr. 5, 1988 [JP] Japan .................................. 63-82282

[51] Int. Cl.[4] ......................... F02F 7/00; F01M 11/00; F16M 1/022

[52] U.S. Cl. ............................. 123/195 H; 123/195 C

[58] Field of Search .......... 123/195 R, 195 A, 195 H, 123/195 C, 198 E

[56] References Cited

U.S. PATENT DOCUMENTS 2,019,558 11/1935 Brush .............................. 123/195 H
4,656,983 4/1987 Anno .............................. 123/195 H
4,793,299 12/1988 Ishimura et al. ................ 123/195 R

FOREIGN PATENT DOCUMENTS 55-40360 9/1980 Japan .
59-34049 3/1984 Japan .
0068756 3/1988 Japan ............................... 123/195 C
2074645 11/1981 United Kingdom ............ 123/195 C

*Primary Examiner*—David A. Okonsky
*Attorney, Agent, or Firm*—Wenderoth, Lind & Ponack

[57] ABSTRACT

A cylinder block reinforcement construction for an engine includes a reinforcement member fixed to a skirt portion of a cylinder block of the half-skirt type and fastened to each of bearing caps bearing the crankshaft of the engine. The reinforcement member is formed in a platelike configuration and a substantially dishlike sectional shape and includes a bottom face portion, side face portions rising from both side ends of the bottom face portion, and flange portions provided at upper edges of the side face portions so as to be fastened to the skirt portion. The reinforcement member is provided, at positions corresponding to respective of the bearing caps and spaced in the axial direction of the crankshaft, with protuberant portions for attachment to respective of the bearing caps. The bottom face portion may be provided with bottom vent holes, each being provided between adjacent of the protuberant portions at a position corresponding to the respective cylinder. The area of each bottom hole at a location where the piston disposed directly thereabove is accompanied by an adjacent piston reciprocated in phase therewith is greater than the area of bottom holes at other locations.

19 Claims, 5 Drawing Sheets

CYLINDER BLOCK REINFORCEMENT CONSTRUCTION FOR ENGINE

BACKGROUND OF THE INVENTION (1) Field of the Invention

This invention relates to a cylinder block reinforcement construction in an engine of the half-skirt type in which the axis of a crank shaft of the engine is located at a lower end portion of the cylinder block.

(2) Description of the Prior Art

A cylinder block reinforcement construction for an engine of the deep-skirt type has been known, as for instance disclosed in Japanese Utility Model Publication No. 55-40360(1980), in which a reinforcement member is disposed between the cylinder block and the oil pan. The reinforcement member comprises a frame member clamped between the skirt portion of the cylinder block and a rail or rim portion of the oil pan, a plurality of transverse members formed integrally with the frame member and fastened by bolts to main bearing caps of the engine, and a longitudinal member integrally formed so as to connect the transverse members to each other. The reinforcement member functions to enhance the stiffness of the skirt portion of the cylinder block as well as of the portions surrounding the main bearings.

An application of the above-mentioned reinforcement member to an engine of the half-skirt type, by reducing the weight of the reinforcement member while maintaining a high degree of stiffness of the reinforcement member, may be contemplated. For instance, the reinforcement member may be formed in a thinner platelike overall configuration, and the portions thereof directly below the cylinders may be projected downward so as to avoid interference with the crankshaft, thus, making the reinforcement member assume a dishlike sectional shape.

If the space defined by the cylinder block and the oil pan is completely partitioned by the platelike reinforcement member into an upper portion on the crank chamber side and a lower portion on the oil pan side, the internal volume of the upper space portion on the crank chamber side is reduced, hindering the movement of gases in the crank chamber accompanying the reciprocation of the piston in each cylinder. Then, the back pressure on the piston is increased, and the attendant increase in resistance to the reciprocating motion of the piston causes a lowering of the thermal efficiency of the engine. It is therefore necessary to provide the platelike reinforcement member with bottom vent holes for communication between the upper space portion on the crank chamber side and the lower space portion on the oil pan side, at portions of the reinforcement member directly below the cylinders.

Providing such bottom holes, however, leads to a lowering of the stiffness of the reinforcement member, and thus, it is desirable that the aperture area of each bottom hole be as small as possible. The increase in the back pressure on a given piston depends on the relationships of the reciprocating motion of such piston with those of the adjacent pistons. When the bottom holes directly below the cylinders are all equally sized, therefore, the back pressure on the piston in a certain cylinder will be higher.

SUMMARY OF THE INVENTION

Accordingly, it is an object of this invention to provide a cylinder block reinforcement construction for an engine which makes it possible to obtain a remarkably high reinforcing effort with a small and lightweight reinforcement member.

It is another object of this invention to provide a cylinder block reinforcement construction for an engine by which it is possible to prevent or suppress an increase in the back pressure acting on the pistons.

According to this invention, there is provided a cylinder block reinforcement construction for an engine comprising a cylinder block of the half-skirt type in which the lower end of a skirt portion of the block fixed to an oil pan is located above the lower ends of bearing caps supporting a crankshaft the engine, and a reinforcement member disposed inside the oil pan and fastened to the lower end of the skirt portion.

The reinforcement member is formed in a platelike configuration and a substantially dishlike sectional shape, the reinforcement member comprising a bottom face portion, side face portions rising from both side ends of the bottom face portion, and flange portions provided at the upper edges of the side face portions so as to be fastened to the lower end of the skirt portion as viewed in the axial direction of the crankshaft.

The reinforcement member is provided with end protuberant portions at both end portions thereof with respect to the axial direction of the crankshaft, the end protuberant portions each being protuberant inwardly from the bottom face portion and the side face portions. Each protuberant portion includes an opposing surface formed in a substantially dishlike sectional shape, as viewed in the axial direction of the crankshaft. Each opposing surface is opposed to the lower surface and side surfaces of a respective bearing cap and is in continuity with the flange portions.

The protuberant portions are each provided with a portion for fastening to the lower surface of the respective bearing cap, and Middle protuberant portion are provided between the end protuberant portions at location opposite to the lower surface of respective middle bearing caps and in continuity with the side face portions.

By the above construction, it is possible to increase the stiffness of the engine block by combining the skirt portion of the cylinder block with the front and rear end protuberant portions of the reinforcement member.

According to this invention, there is also provided a cylinder block reinforcement construction for an engine comprising a cylinder block of the half-skirt type, an oil pan, and a reinforcement member fixed between the skirt portion of the cylinder block and the oil pan, the reinforcement member being fastened to bearing caps supporting a crankshaft of the engine.

The reinforcement member is formed in a platelike configuration and a substantially dishlike cross-sectional shape, the reinforcement member comprising a bottom face portion, side face portions rising from both side ends of the bottom face portion, and flange portions provided at the upper edges of the side face portions so as to be fastened to the lower end of the skirt portion.

The reinforcement member is provided with protuberant portions at positions corresponding to respective bearing caps of the engine and spaced in the axial direction of the crankshaft. The protuberant portions are elongated orthogonally to such axial direction, and have portions for fastening to the bearing caps.

The reinforcement member is provided with bottom holes in the bottom face portion thereof. Each of the bottom holes is provided between adjacent protuberant portions at a position corresponding to a respective cylinder of the engine block. The area of each bottom hole at a location where the piston disposed directly thereabove is accompanied by an adjacent piston reciprocated in phase therewith is greater than the area of the bottom holes at other locations.

The bottom holes provided in the bottom face portion of the reinforcement member as mentioned above provide for ventilation. Since providing the bottom holes causes a lowering in the stiffness of the reinforcement member, it is desirable that the aperture area of the bottom holes be set to a minimum required value. According to this invention, the aperture area of a particular bottom hole at a location where the piston directly above such bottom hole is reciprocated in phase with an adjacent piston is greater than the aperture area of bottom holes at other locations. Where piston, the is reciprocated in phase with the adjacent piston, the back pressure exerted on the piston as the piston moves downward tends to be higher than the corresponding back pressure in other situations. To avoid this increase in back pressure the relevant bottom hole is made larger in size. On the other hand, where a piston is not reciprocated in phase with any adjacent piston, the back pressure exerted on the piston as the piston moves downward is easily relieved into the space below the adjacent piston. Therefore, a bottom hole with a smaller area suffices in this case. With the bottom hole thus made smaller in size, the strength of the reinforcement member is increased accordingly.

The above and other objects, features and advantages of the present invention will become apparent from the following description and appended claims taken in confunction with the accompanying drawings which show by way of example some preferred embodiments of this invention.

DESCRIPTION OF PREFERRED EMBODIMENT

Figure 1:
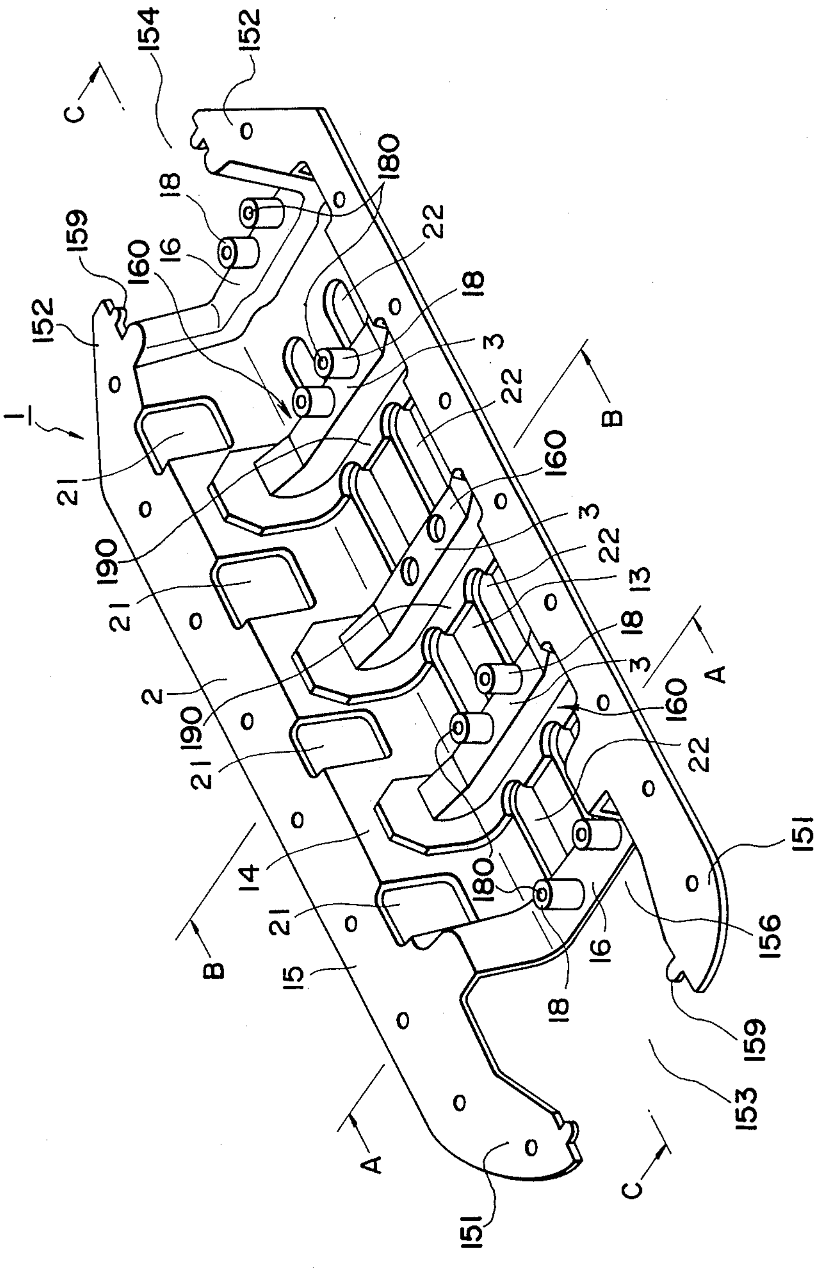
FIG. 1 is a perspective view of a reinforcement member according to one embodiment of this invention.

Referring to FIG. 1, there is shown a reinforcement member 1 for an in-line four-cylinder engine. The reinforcement member 1 comprises three reinforcing members 3 welded to a main plate 2, the A—A section, B—B section and C—C section of the reinforcement member as mounted on the engine being shown in FIGS. 2, 3 and 4, respectively.

Figure 2:
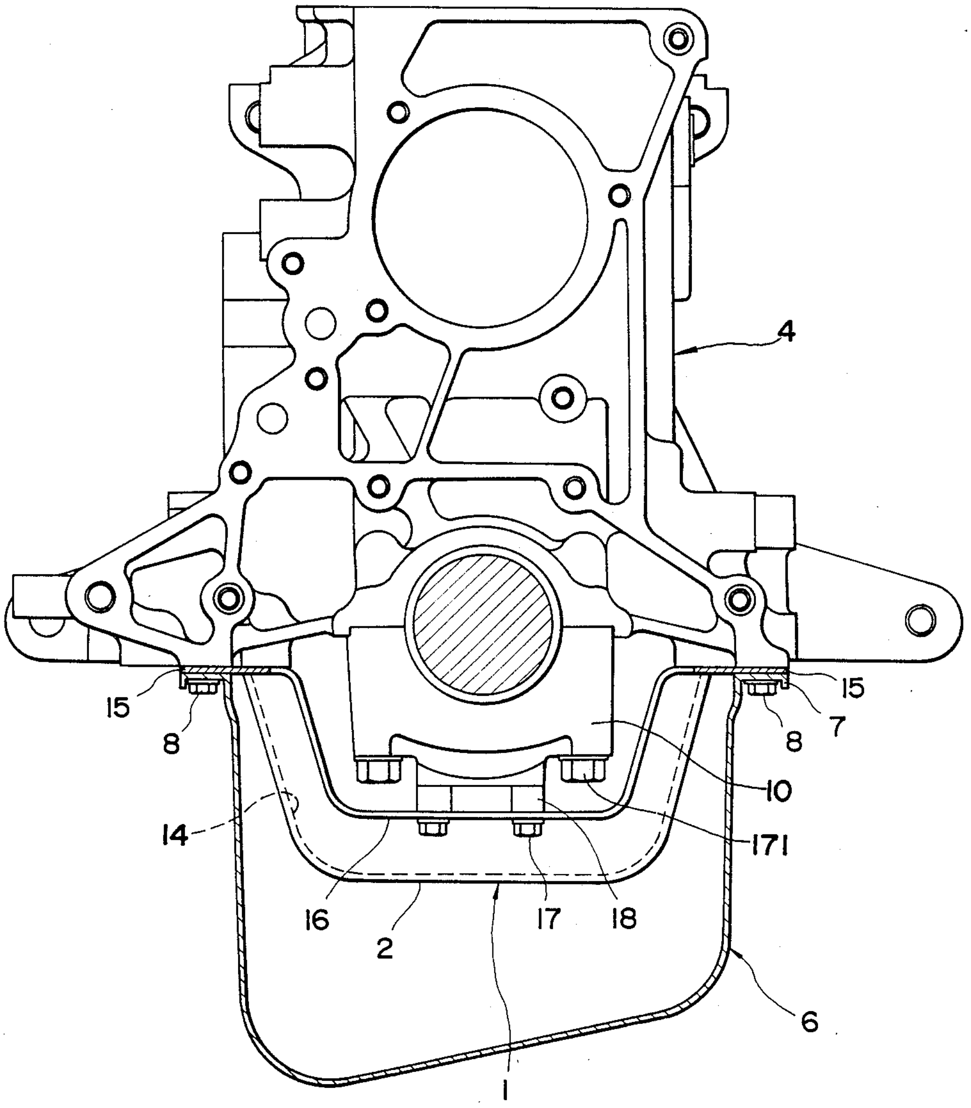
FIGS. 2, 3 and 4 are sectional views taken along line A—A, line B—B and line C—C, respectively, of FIG. 1, showing the reinforcement member as mounted on an engine.
Figure 3:
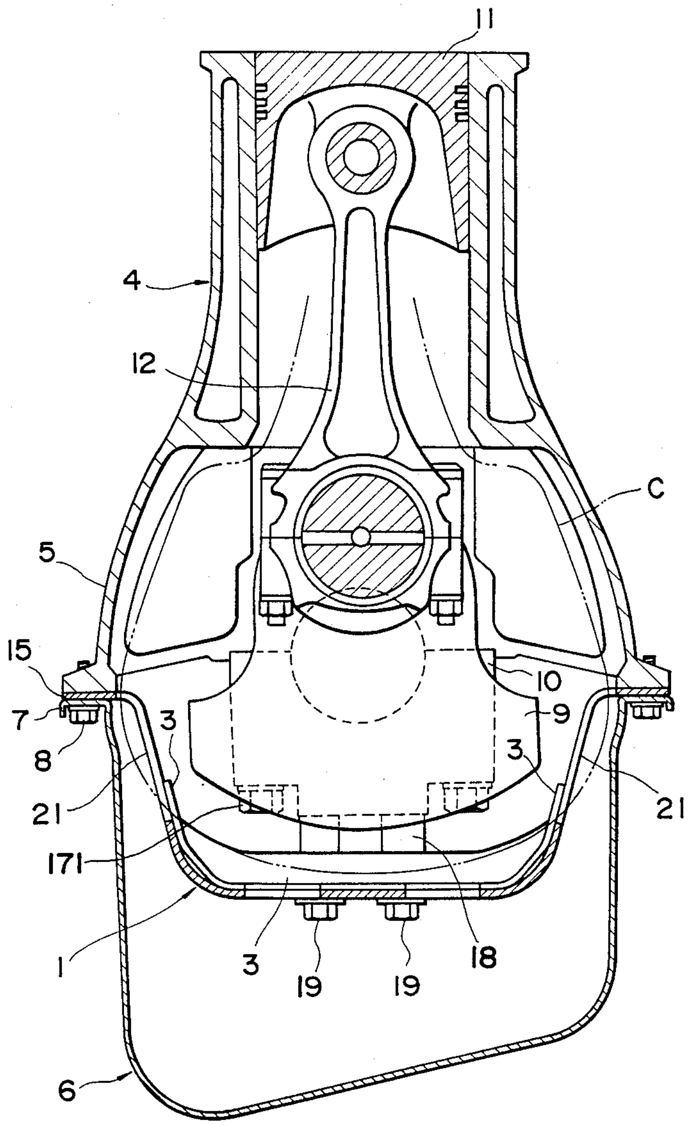
Figure 4:
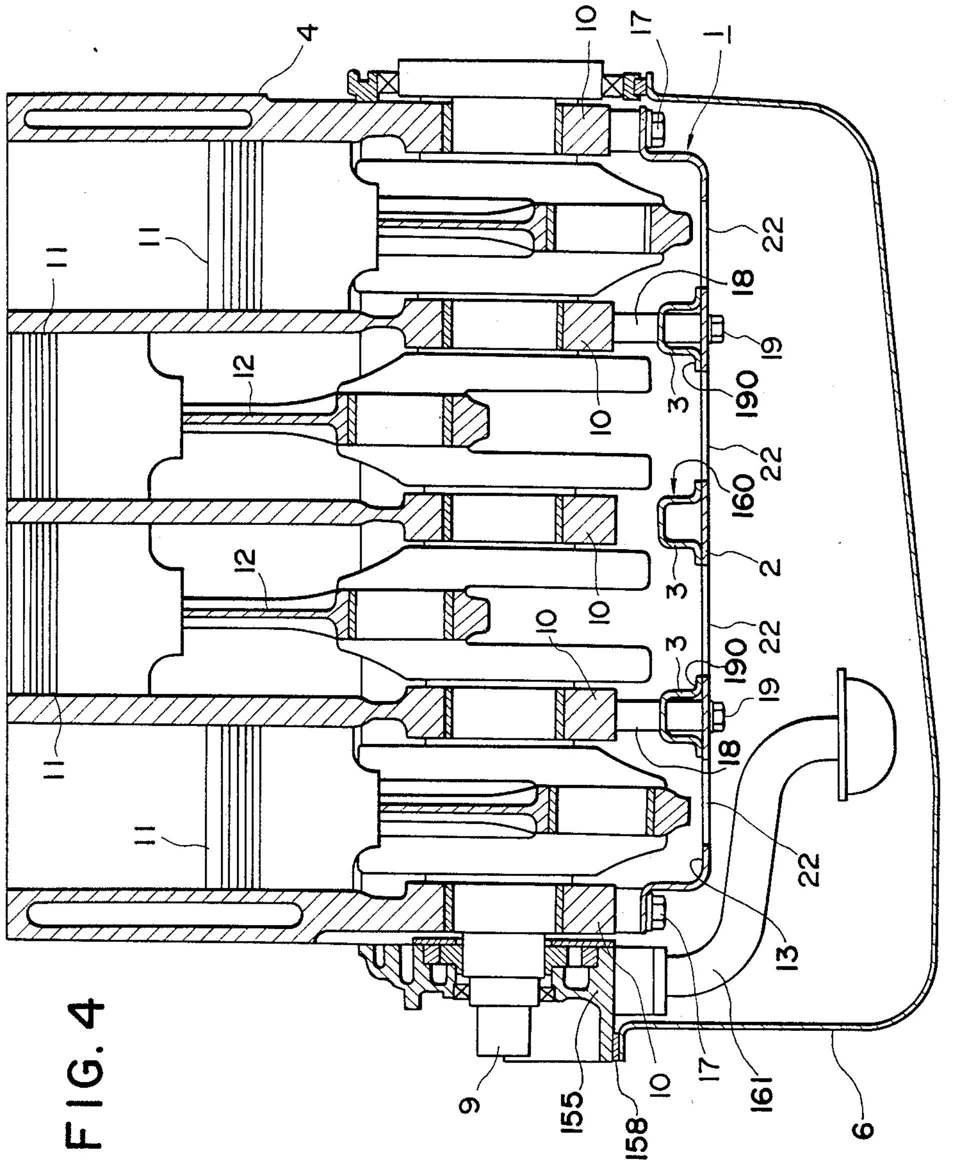

In FIGS. 2, 3 and 4 there are shown a cylinder block 4, a skirt portion 5 of the cylinder block 4, an oil pan 6, a rail or rim portion 7 of the oil pan, and bolts 8 for fastening the reinforcement member 1 of this invention and the oil pan rail portion 7 to a lower portion of the cylinder block skirt portion 5. There are also shown a crankshaft 9, main bearing caps 10 for mounting the crankshaft 9 on the cylinder block 4, pistons 11, and connecting rods 12. The in-line four-cylinder engine, naturally, has five main bearing caps 10.

The cylinder block reinforcement construction of this invention comprises the cylinder block 4 of the half-skirt type in which the lower end of the skirt portion 5 fiXed to the oil pan 6 is located above the lower ends of bearing caps 10 supporting the crankshaft 9, and the reinforcement member 1 disposed inside the oil pan 6 and fastened to the lower end of the skirt portion 5, wherein the reinforcement member 1 is formed in a platelike configuration and a substantially dishlike cross-sectional shape. The reinforcement member 1 includes a bottom face portion 13, side face portions 14 rising from both side ends of the bottom face portion 13, and flange portions 15 provided at the upper edges of the side face portions 14 so as to be fastened to the lower end of the skirt portion 5 as viewed in the axial direction of the crankshaft 9. The reinforcement member is provided with end protuberant portions 16 at both end portions thereof with respect to the axial direction of the crankshaft 9, the end protuberant portions 16 each being protuberant inwardly from the bottom face portion 13 and the side face portions 14 and comprising an opposing surface formed in a substantially dishlike cross-sectional shape, as viewed in the axial direction of the crankshaft 9. Each opposing surface is opposed to the lower surface and side surfaces of a respective endmost bearing cap 10 and is in continuity with the flange portions 15. The protuberant portions 16 are each provided with a portion for fastening to the lower surface of the respective bearing cap 10. A middle protuberant portion 160 is provided between the end protuberant portions 16 oppositely to the lower surface of each of the bearing caps 10 between the opposite endmost bearing caps and in continuity with the side face portions 14.

By the above mentioned construction, it is possible to increase the stiffness of the engine block in combining the skirt portion 5 of the cylinder block 4 with the front and rear end protuberant portions 16 of the reinforcement member 1.

As shown in FIG. 1, the reinforcement member 1 comprises as a main body the main plate 2 constituted of sheet metal curved into a substantially dishlike shape. Side face portions 14 rise from both side ends of the bottom face portion 13 of the main plate 2, and flange portions 15 are provided at the upper edges of the side face portions 14. The flange portions 15 are firmly attached, together with the oil pan rail portions 7, to the skirt portion 5 of the cylinder block by the bolts 8.

Front and rear ends 151, 152 of the flange portions 15, extending in a beltlike form along the axial direction of the crankshaft 9, of the reinforcement member 1 are free ends extending along flanges of the oil pan 6 and opened in the direction of the axis of the crankshaft 9. Such free ends are located in positions symmetrical with respect to the axis of the crankshaft 9. Cutout spaces 153, 154 between the opposing free ends are located on the end sides of the end protuberant portions 16 in the axial dirention of the crankshaft 9.

It is possible to increase the stiffness of the reinforcement member 1 between both front and rear end portions.

A casing 155 is fastened to the front end of the cylinder block 4, the lower end of the casing 155 being flush with the lower end of the skirt portion 5 of the cylinder block 4. The flange portions 15 at the upper edges of the side face portions 14 of the reinforcement member 1 are fastened, at portions thereof on the front side of the front end protuberant portion 16, to the lower end of the casing 155. The flange portions 15 are clamped between the lower ends of the skirt portion 5 and of the casing 155 and the flange at the upper edge of the oil pan 6.

This construction also stiffens the casing 155, and it is possible additionally to increase the stiffness of the flange portion oil pan 6 by such clamping.

Figure 5:
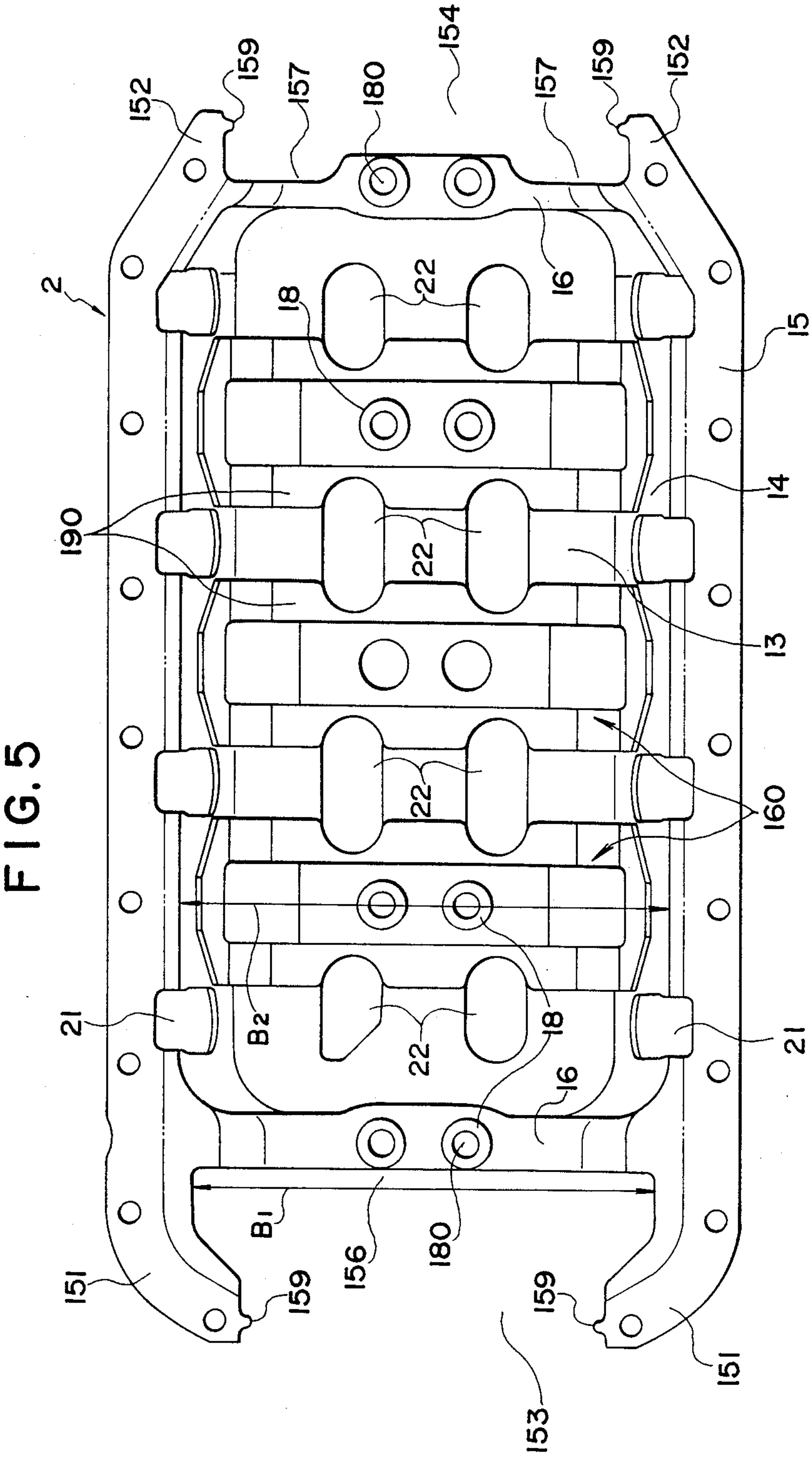
FIG. 5 is a plan view showing the shapes of the bottom holes provided in the reinforcement member.

The reinforcement member 1 is provided, on the front side of the opposing surface of the front end protuberant portion 16 thereof, with a bottom face cutout 156 in continuity with the cutout space 153 defined by the flange portions 15, and the width B1 of the bottom face cutout 156 along a direction orthogonal to the axial direction of the crankshaft 9, as viewed in a direction axially of the cylinders. is smaller than a spacing B2 in the orthogonal direction between the flange portions 15 between the end protuberant portions 16 (FIG. 5)

In this construction, it is possible to prevent the reinforcement member 1 from having a decreased strength, while still providing the front portion of the reinforcement member 1 with the cutout 156 penetrating into the oil pan 6.

The opposing surface of the rear end protuberant protion 16 of the reinforcement member 1 is provided with an opening 157 by cutting out a predetermined amount forwardly from the rear end edge of the opposing surface.

Thus, a ventilating and oil returning space can be provided at the rear end portion of the reingforcement member 1. An oil seal member 158 is disposed in each of the cutout spaces 153, 154 at the front ends and the rear ends of the flange portions 15, and the opposing free ends are each provided with a protruding portion 159 for engagement with an engaging recess (not shown) of the respective oil seal member 158.

By this construction, it is possible to fix the oil seal member 158.

The casing 155 is an oil pump casing comprising a pump chamber, and the bottom face portion on the front side of the front end protuberant portion 16 of the reinforcement member 1 is provided with a cutout for fitting an oil strainer 161.

This is a preferable arrangement for the oil pump casing 155 and the oil strainer 161.

Each middle protuberant portion 160 of the reinforcement member 1 is a platelike reinforcing member 3 that is substantially hat-shapedd in cross section, extending orthogonally to the axial direction of the crankshaft 9, and firmly attached to the bottom face portion 13 and the side face portions 14 of the reinforcement member 1. Seat members 18 are firmly attached to the upper surfaces of all the protuberant protions 16, 160, the seat members 18 each being provided with a hole 180 for fitting a bolt 17, 19 for fastening to the respecture bearing cap 10.

By separating the reinforcing member 3 from the reinforcement member 1 and producing it independently, it is possible to increase the efficiency of production of the reinforcement member 1. It thus is possible to align precisely the height of the fastening surfaces of the protuberant portions 160 to which the middle bearing caps 10 are fastened, even with variations of the precision of attachment of the reinforcing members 3 to the reinforcement member 1 and of the accuracy of formation of the reinforcing members 3.

Each bearing cap 10 is provided, in addition to holes for fitting bolts 171 for fastening to the cylinder block 4, with a portion for fastening to the respective protuberant portion 16, 160 of the reiforcement member 1, so as to enable each protuberant portion 16, 160 and the respective bearing cap 10 to be fastened to each other by a screwing member, i.e. bolt, 17, 19 employed exclusively for such purpose.

The influence of a load acting the bearing cap 10 to the protuberant portions 16, 160 is decreased by using the exclusive bolts 17, 19, and also such arrangement can prevent loosening of the fastening force of bolts 171.

The position of fastening of the exclusive-use screwing members 17, 19 is located between the holes for fitting the bolts 171 for fastening to the cylinder block 4.

The opposing surface of each of the end protuberant portions 16 are as close as possible to the respective bearing cap 10, thereby increasing the stiffness between each protuberant portion 16 and the respective bearing cap 10.

Protuberant portions 16, elongated in directions orthogonal to the crankshaft, rise from both ends of the bottom face portion of the main plate 2, and are firmly attached by bolts 17 to lower portions of respective end caps 10 of the five main bearing caps 10. Two cylindrical seats 18 are provided on the upper surface of each of the protuberant portions 16. Each of the bolts 17 penetrates the seat 18 from the lower side of the main plate 2, and is firmly attached to the respective main bearing cap 10.

The engine comprises four culinder bores arranged in the axial direction of the crankshaft 9, and all the bearing caps 10, exclusive only of the centrally located bearing cap 10, are connected to the corresponding protuberant portions 16, 160 opposed thereto.

The center bearing cap 10 located between the adjacent pistons 11 reciprocated in phase is acted on by a larger reciprocated inertial force than the other bearing caps 10. Thus, by not fastening the center bearing cap 10 to the respective protuberant portion, it can be prevented from transmitting large vibration energy to the center reinforcing member 3. This construction easily is made possible by use of the exclusive bolts 19.

Each seat member 18 on the other middle protuberant portions 160 is formed by bosses forming the hole 180 for fitting a bolt 19 and, to attached firmly to both the bottom face portion 13 and the upper surface of the protuberant portion 160.

It is possible to increase the stiffness of the fastening arrangement by connecting the bottom face portion 13 of the reinforcement member 1, protuberant portion 16, 160 and the boss 18.

The three reinforcing members 3 of the reinforcement member 1 correspond to, and are firmly attached to, the middle caps 10 of the five main bearing caps 10, except for the center cap. Namely, the reinforcing members 3 constituted of elongate sheet metal are, hat-shaped in section, are disposed orthogonally to the crankshaft, are welded to the upper side of the main plate 2, and are firmly attached by bolts 19, except the center reinforcing member 3 corresponding to the center cap 10, to lower portions of the middle main bearing caps 10 located in the middle portion of the engine. Two cylindrical seats 18 are provided also on the upper surface of each of the reinforcing members 3, and each of the bolts 19 penetrates the seat 18 from the lower side of the main plate 2 to be firmly attached to the respective main bearing cap 10.

The dishlike section of the reinforcement member 1 is arranged so that upper positions of the side face portions 14 are located inside the paths of rotation C of connecting rods 12, as viewed in the axial direction of the crankshaft 9.

By this construction, the oil pan 16 and the engine block of the half-skirt type may be much smaller than previously possible.

The side face portions 14 of the reinforcement member 1 are provided, at upper positions between the protuberant portions 160, with cutouts 21 for avoiding interference with the paths of rotation C of the connecting rods 12, Thus, side face portions 14 of the main plate 2 are provided with window holes 21 formed by such cutouts, four window holes 21 on either side, for avoiding interference with paths of motion of the connecting rods 12, denoted by the two-dotted chaim line C in FIG. 3. Each end portion of the reinforcing member 3 rises along the respective side face portion 14 from the bottom face portion 13 of the main plate 2, to a position above the lower edge position of the window holes 21. The window holes 21 are equally shaped rectangular holes, and the lower edges of the four window holes 21 on the same side are aligned in a straight line. Both end portions of each reinforcing member 3 are each located between adjacent window holes 21 and extend to positions above the lower edge positions of the window holes 21. The reinforcing members 3 are welded to the main plate 2, both above and below the positions of the lower edges of the window holes 21.

The bottom face portion 13 is provided with bottom holes 22, each of the bottom holes 22 being provided between respective protuberant portions 16, 160 at a position corresponding to a respective cylinder. The area of each bottom hole 22 at a location where the piston 11 disposed directly thereabove is accompanied by an adjecent piston 11 reciprocated in phase therewith is greater than other bottom holes 22 at locations where the pistons 11 disposed directly thereabove are not accompanied by an adjacent piston 11 reciprocated in phase therewith.

The end edge portions, in the axial direction of the crankshaft 9, of the holes 22 formed in the bottom face portion 13 of the reinforcement member 1 are located in lug portions 190 of the platelike reinforcing members 3 of the reinforcement member. The lug portions 190 are mounted on the bottom face portion 13 whereby the peripheral edge of each hole 22 is defined both by the bottom face portion 13 and by the lug portion 190.

It is possible to increase the stiffness around the holes 22 by this use of the lug portions 190 of the reinforcing members 3.

The bottom face portion of the main plate 2 is provided with two bottom holes 22, directly below each of the four pistons 11. The bottom holes 22 serves as oil return holes and also as vent holes for relieving the back pressure exerted on the pistons 11 during motion of the pistons.

FIG. 5 shows, the sizes and shapes of the bottom holes 22. As is clearly shown in the figure, this aperture area of the bottom holes 22 provided near the protuberant portions 16 at the ends of the main plate is less than the aperture area of the middle bottom holes 22. The two center pistons are moved in phase with each other and are moved in opposite phase to the two end pistons.

As shown in FIG. 4, the end pistons 11 of the four-cylinder engine are located directly above the respective end bottom holes 22, having a smaller aperture area, whereas the middle pistons 11 are located directly above the respective bottom holes 22, having a larger area. Therefore, for each middle piston, there exists an adjacent piston moving in phase therewith. For each end piston, there exists a non-adjacent piston moving in phase therewith. The aperture area of the middle bottom holes 22 is greater than the aperture area of the end bottom holes 22.

In the construction as mentioned above, when the two middle pistons are moved upward while the two end pistons are moved downward, the back pressure exerted on the pistons moved downward is relieved through the end bottom holes 22, and also relieved sideways through the gaps between the main bearing caps 10 and the protuberant portions 16 as well as through the gaps between the main bearing caps 10 and the reinforcing members 3. For this reason the aperture area of the end holes 22 can be made smaller.

Since the two middle pistons are moved downward simultaneously, the back pressure exerted on each of the middle pistons cannot be relieved to the side of the adjacent piston (middle piston) moved in phase, but can be relieved to the side of another adjacent piston (end piston) moved in opposite phase. If the aperture area of the middle bottom holes 22 is not set to be slightly larger than the aperture area of the end bottom holes 22 at both ends, the back pressure relief characteristics for the middle pistons will be different from those for the end pistons.

It is possible to set the aperture area of the end bottom holes 22 at both ends to be smaller than the aperture area of the middle bottom holes 22 in middle portions, without causing any problem as to ventilation characteristics. By setting the end bottom holes 22 smaller in size, it is possible to maintain the strength of the main plate 2 at a high level, and it is also possible to provide a reinforcing rib at each corner portion formed by the bottom face portion 13 and the protuberant portion 16 of the main plate 2. Thus, the reduction in the size of the end bottom holes provides a spatial advantages, thereby making it possible to acheive a reinforcement member 1 of higher stiffness.

As has been described in detail above, the cylinder block reinforcement construction for an engine according to this invention enables effective reinforcement of the cylinder block with a small and lightweight reinforcement member. Particularly, since the bottom face portion of the reinforcement member is provided with bottom holes at positions corresponding to respective of the cylinders and each aperture area of the bottom hole at a location where the piston directly thereabove is accompanied by an adjacent piston moving is phase therewith is greater than bottom holes at other locations, it is possible to set the areas of the bottom holes to minimum required values while preventing or suppressing an increase in back pressure exerted on a particular piston. It is thus possible to minimize the decrease in the strength of the reinforcement member arising from the formation of the bottom holes. Therefore, it is possible to provide a reinforcement member having sufficient total strength, thereby effectively reinforcing the cylinder block.

What is claimed is:

1. A cylinder block reinforcement construction for an engine comprising a cylinder block of the half-skirt type in which the lower end of a skirt portion of the block fixed to an oil pan of the engine is located above the lower ends of bearing caps supporting a crankshaft of the engine, and a reinforcement member disposed inside the oil pan and fastened to the lower end of the skirt portion, wherein:

said reinforcement member is formed in a platelike configuration and a substantially dishlike cross-sectional shape, said reinforcement member comprising a bottom face portion, side face portions rising from both side ends of said bottom face portion, and flange portions provided at upper edges of said side face portions so as to be fastened to the lower end of the skirt portion as viewed in the axial direction of the crankshaft;

said reinforcement is provided with end protuberant portions at both end portions thereof with respect to the axial direction of the crankshaft, said end protuberant portions each being protuberant inwardly from said bottom face portion and said side face portions and comprising an opposing surface formed in a substantially dishlike cross-sectional shape, as viewed in the axial direction of the crankshaft, each said opposing surface being opposed to the lower surface and side surfaces of a respective end bearing cap and being in continuity with said flange portions;

said protuberant portions are each provided with a portion for fastening to the lower surface of the respective end bearing cap; and a middle protuberant portion is provided between said end protuberant portions opposite to the lower surface of each bearing cap between the end bearing caps and in continuity with said side face portions.

2. The cylinder block reinforcement construction as set forth in claim 1, wherein front and rear ends of said flange portions, extending in a beltlike form along the axial direction of the crankshaft, of said reinforcement member are free ends extending along flanges of the oil pan and opened in the direction of the axis of the crankshaft, said free ends being located at symmetrical positions with respect to the axis of the crankshaft, and cutout spaces between opposed said free ends are located on end sides of side said end protuberant portions in the axial direction of the crankshaft.

3. The cylinder block reinforcement construction as set forth in claim 2, wherein a casing is fastened to the front end of the cylinder block, the lower end of the casing being flush with the lower end of the skirt portion of the cylinder block, said flange portions at said upper edges of said side face portions of said reinforcement member are fastened, at portions thereof on the front side of the front said end protuberant portion, to the lower end of the casing, and said flange portions are all clamped between the lower ends of the skirt portion and of the casing and a flange at the upper edge of the oil pan.

4. The cylinder block reinforcement construction as set forth in claim 3, wherein said reinforcement member is provided, on the front side of said opposing surface of said front end protuberant portion thereof, with a bottom face cutout in continuity with said cutout space defined between said flange portions, and the width of said bottom face cutout along a direction orthogonal to the axial direction of the crankshaft, as viewed in the cylinder axial direction, is smaller than the spacing in the orthogonal direction between said flange portions between said end protuberant portions.

5. The cylinder block reinforcement construction as set forth in claim 4, wherein said opposing surface of the rear said end protuberant portion of said reinforcement member is provided with an opening by cutting out a predetermined amount forwardly from the rear end edge of said opposing surface.

6. The cylinder block reinforcement construction as set forth in claim 5, wherein said bottom face portion is provided with bottom holes, each of said bottom holes being provided between adjacent said protuberant portions at a position corresponding to a respective cylinder, and the area of each said bottom hole, at a location where a piston disposed directly thereabove is accompanied by an adjacent piston reciprocated in phase therewith, is greater than the area of said bottom holes at other locations.

7. The cylinder block reinforcement construction as set forth in claim 2, wherein an oil seal member is disposed in each of said cutout spaces at front ends and rear ends of said flange portions, and said opposed free ends are each provided with a protruding portion for engagement with an engaging recess of the oil seal member.

8. The cylinder block reinforcement construction as set forth in claim 3, wherein the casing is an oil pump casing comprising a pump chamber, and a bottom face portion on the front side of said front end protuberant portion of said reinforcement member is provided with a cutout for fitting an oil strainer.

9. The cylinder block reinforcement construction as set forth in claim 1, wherein said middle protuberant portion of said reinforcement member is a platelike reinforcing member that is substantially hat shaped in cross section, extending orthogonally to the axial direction of the crankshaft, and firmly attached to said bottom face portion of side side face portions of said reinforcement member, and seat members are firmly attached to the upper surface of all said protuberant portions, said seat members each being provided with a hole for fitting a bolt for fastening to the respective bearing cap.

10. The cylinder block reinforcement construction as set forth in claim 9, wherein each bearing cap is provided, in addition to holes for fitting bolts for fastening to the cylinder block, wigh a portion for fastening to the respective said protuberant portion of said reinforcement member, so as to fasten said protuberant portion and the bearing cap to each other by an exclusive-use screwing member.

11. The cylinder block reinforcement construction as set forth in claim 10, wherein the fastening position of the exclusive-use screwing member is located between the holes for fitting the bolts for fastening to the cylinder block.

12. The cylinder block reinforcement construction as set forth in claim 10, wherein the engine comprises four cylinder bores arranged in the axial direction of the crankshaft, and all the bearing caps, exclusive only of the centrally located bearing cap, are connected to respective said protuberant portions opposed thereto.

13. The cylinder block reinforcement construction as set forth in claim 9, wherein a hole is formed in said bottom face portion of said reinforcement member, side edge portions, in the axial direction of the crankshaft, of said hole are located at a lug portion of said platelike reinforcing member of the reinforcement member, said lug portion being mounted on said bottom face portion, whereby the peripheral edge of said hole is formed by both said bottom face portion and said lug portion.

14. The cylinder block reinforcement construction as set forth in claim 9, wherein said seat member on said middle protuberant portion is a boss for forming a hole for fitting a bolt attached firmly to both said bottom face portion and the upper surface of said middle protuberant portion.

15. The cylinder block reinforcement construction as set forth in claim 1, wherein the dishlike section of said reinforcement member is shaped such that upper portions of said side face portions are located inside paths of rotation of connecting rods of the engine, as viewed in the axial direction of the crankshaft, at positions of said protuberant portions, in the axial direction.

16. The cylinder block reinforcement construction as set forth in claim 15, wherein said side face portions of said reinforcement member are provided, at upper positions thereof between adjacent said protuberant portions, with cutouts for avoiding interference with the paths of rotation of the connecting rods, and said middle protuberant portion of said reinforcing member is extended to a position above lower edges of said side face cutouts.

17. A cylinder block reinforcement construction for an engine comprising a cylinder block of the half-skirt type, and oil pan, and a reinforcement member fixed between a skirt portion of the cylinder block and the oil pan, said reinforcement member being fastened to bearing caps supporting a crankshaft, wherein:

said reinforcement member is formed in a platelike configuration and a substantially dishlike cross-sectional shape, said reinforcement member comprising a bottom face portion, side face portions rising from both side ends of said bottom face portion, and flange portions provided at upper edges of said side face portions so as to be fastened to the lower end of the skirt portion;

said reinforcement member is provided with protuberant portions at positions corresponding to each bearing cap in the axial direction of the crankshaft, said protuberant portions, elongated orthogonally to the axial direction, having portions fastened to the bearing caps;and said reinforcement member is provided in said bottom face portion thereof with bottom holes, each of said bottom holes being provided between adjacent said protuberant portions at a position corresponding to a respective cylinder of the block, and the area of each said bottom hole at a location where a piston disposed directly thereabove is accompanied by an adjacent piston reciprocated in phase therewith, is greater than the area of said bottom holes at other locations.

18. The cylinder block reinforcement construction as set forth in claim 17, wherein front and rear ends of said flange portions, extending in a beltlike form along the axial direction of the crankshaft, of said reinforcement member, are free ends extending along flanges of the oil pan and opened in the direction of the axis of the crankshaft, said free ends being located at symmetrical positions with respect to the axis, and cutout spaces between opposed said free ends are located on end sides of said protuberant portions;

said reinforcement member is provided, on the front side of an opposing surface of the front end said protuberant portion thereof, with a bottom face cutout in continuity with said cutout space defined between said flange portions, and the width of said bottom face cutout along a direction orthogonal to the axial direction of the crankshaft, as viewed in the cylinder axial direction, is smaller than the spacing in the orthogonal direction between said flange portions between endmost of said protuberant portions; and an opposing surface of a rear end said protuberant portion of said reinforcement member is provided with an opening by cutting out a predetermined amount forwardly from the rear end edge of said opposing surface.

19. The cylinder block reinforcement construction as set forth in claim 17, wherein said protuberant portions except those at opposite ends, in the axial direction of the crankshaft, of said reinforcement member are platelike reinforcing members, and a hole is formed in said bottom face portion of said reinforcement member, side edge portions, in the axial direction of the crankshaft, of said hole are located at a lug portion of said reinforcing member, said lug portion being mounted on said bottom face portion, whereby the peripheral edge of said hole is formed by both said bottom face portion and said lug portion.

* * * * *